Aug. 1, 1967  S. L. SEYMOUR  3,333,934
METHOD OF AND APPARATUS FOR SHAPING GLASS SHEETS WITH
OPPOSED PRESSING MEMBERS
Filed Feb. 3, 1964  2 Sheets-Sheet 1

INVENTOR
SAMUEL L. SEYMOUR
BY
Oscar L. Spencer
ATTORNEY

Aug. 1, 1967  S. L. SEYMOUR  3,333,934
METHOD OF AND APPARATUS FOR SHAPING GLASS SHEETS WITH
OPPOSED PRESSING MEMBERS
Filed Feb. 3, 1964  2 Sheets-Sheet 2
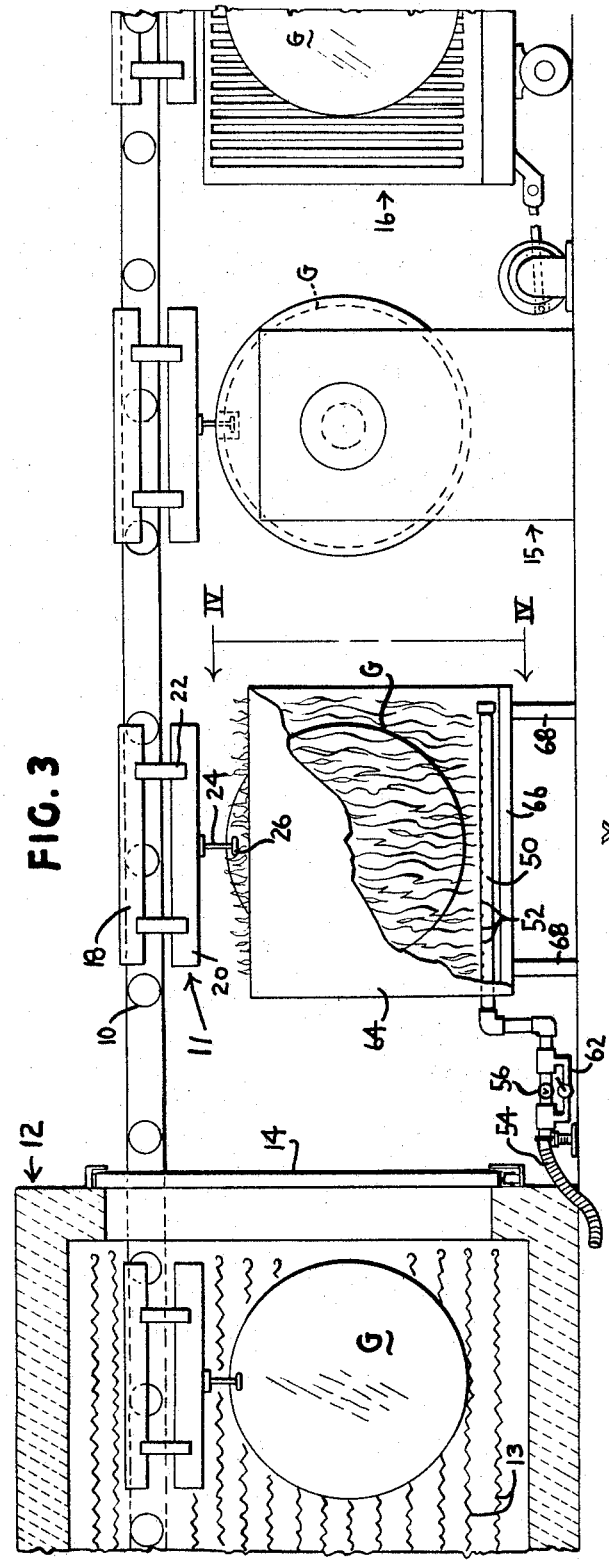
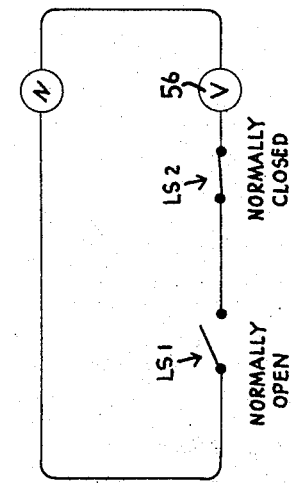
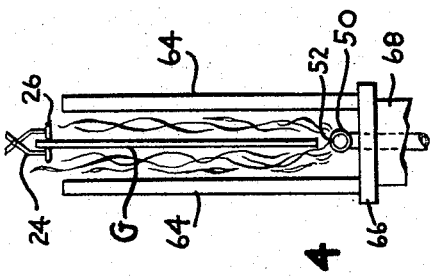
INVENTOR.
SAMUEL L. SEYMOUR
BY *Oscar L. Spencer*
ATTORNEY United States Patent Office 3,333,934
Patented Aug. 1, 1967

3,333,934
METHOD OF AND APPARATUS FOR SHAPING GLASS SHEETS WITH OPPOSED PRESSING MEMBERS
Samuel L. Seymour, Oakmont, Pa., assignor to Pittsburgh Plate Glass Company, Pittsburgh, Pa., a corporation of Pennsylvania
Filed Feb. 3, 1964, Ser. No. 342,015
10 Claims. (Cl. 65—32)

ABSTRACT OF THE DISCLOSURE

Shaping vertically disposed glass sheets by heating the sheet to an elevated temperature sufficient to shape the glass in an enclosed atmosphere, removing the sheet to a relatively cool atmosphere and then reheating the sheet in a manner that applies more heat to the lower regions of the sheet to offset the more rapid rate of cooling of the lower regions of the sheet in said relatively cool atmosphere and press shaping the reheated sheet between complementary shaping members. Apparatus for performing the method comprises an apertured gas pipe located outside the enclosed atmosphere below the path of glass sheet movement having apertures opening upward to promote the upward flow of hot gas along the major glass sheet surfaces outside the enclosed atmosphere.

The present invention relates to shaping glass sheets and particularly refers to improvements in method and apparatus for shaping glass sheets wherein a heat-softened glass sheet is supported in spaced relation between two glass shaping members having complementary convex and concave shaping surfaces and wherein the glass is heat-softened and shaped by being sandwiched in pressurized contact between said shaping surfaces while in a heat-softened condition.

Glass sheets are usually shaped successively in a mass-production operation by heat-softening the glass sheets while conveyed in succession through a tunnel-like furnace. Thereafter the glass sheet is removed from the furnace and while still sufficiently hot to be deformed, the major surfaces of the heat-softened glass sheet are sandwiched in pressurized contact between a pair of glass shaping members having complementary convex and concave shaping surfaces opposing one another. These shaping surfaces are usually covered with asbestos or fiber glass to prevent direct contact between the shaping member surface and the glass surface thereby preventing undesirable glass surface marking. Thereafter, the bent sheet may be quenched if desired while still at or above a temperature sufficient for tempering.

If it were practical to maintain the glass shaping members within the furnace, the glass sheet would be shaped while within the furnace. However, the elevated temperature of the furnace is sufficient to raise the glass to a temperature of about 1225 degrees Fahrenheit. At this elevated temperature, the fiber glass covers for the glass shaping members become worn quite rapidly and require frequent replacement. It is impossible to replace the fiber glass covers within the furnace unless the furnace operation is discontinued to enable access to the furnace.

Also, the bearings and other moving parts of the shaping members have a short life at furnace temperatures and require frequent replacement. Accordingly, a practical operation requires a glass shaping station to be outside the furnace.

It is also impractical to heat the shaping members to elevated temperatures outside the furnace because their large mass and high heat capacity requires much thermal input. The fiber glass covers would require frequent replacement in this case also because they would be exposed continuously to the high temperature of the glass shaping member.

For the above reasons, the glass sheets are shaped by pressurized contact with relatively cold shaping members located outside the furnace. During this operation, and particularly during the shaping, the glass is supported in a substantially vertical position.

Several techniques have been employed for supporting glass in a vertical position. One type of support involves resting the bottom edge of the glass sheet on a series of spaced supports and loosely engaging the upper and/or side edges with a series of balancing elements in the form of loosely fitting hairpin-type structures. Another technique involves gripping the glass near its upper edge by one or more sets of tong gripping elements. Still another technique involves supporting the bottom edge of the glass in the recesses of spaced glass conveyor elements which propel the glass in a forward direction while upward fluid blasts balance the glass between a pair of closely spaced walls.

Any of the above techniques or combinations thereof may be used in performing the present invention.

In a press bending operation of the type described above, the temperature to which the glass is heated is very critical. If the glass temperature is raised too high within the furnace, the glass sheet becomes misshapen and distorted before it reaches a position between the glass shaping members. If the glass is not heated to a sufficiently high temperature, it may be chill-cracked during the shaping operation.

Glass sheets having a nominal thickness of ¼ inch or more retain a relatively large heat reservoir within the body of the glass sheet. Heat from the interior heat reservoir is conducted to the surface of the sheet to raise the surface temperature in response to the surface cooling that takes place in the glass upon removing the latter from the furnace. This heat conduction continues during the shaping operation and during the interval between the glass shaping and the tempering operation when the glass is suddenly quenched between opposing blasts of cold air to impart a temper to the glass sheets.

This heat reservoir within glass sheets of ¼ inch nominal thickness tends to heat the surface by conduction at about the same rate as the surface of the glass cools by radiating heat during the short time needed for conveying the glass from the exit of the furnace to the glass shaping station. However, thinner glass sheets do not have a sufficiently large heat reservoir to provide enough heat conduction to the surface to compensate for the surface heat loss.

When bending glass sheets having a nominal thickness less than ¼ inch, the time and temperature relationship of the heating and transfer steps becomes more critical. When treating such thin glass sheets, it is very difficult to keep the glass from distorting when the temperature is raised too high within the furnace. On the other hand, since thin glass sheets cool very rapidly when they are removed from the furnace, it is also difficult to keep the glass sheets from being susceptible to cold chipping along their edges because they are not at sufficiently high temperatures for proper bending and tempering.

One benefit of the present invention is to overcome the insufficiency of heat stored in the interior of relatively thin glass sheets to compensate sufficiently for the surface heat loss once the sheet is removed from the furnace.

Another benefit of the present invention is to control the stress formed within the lower portion of pressed glass sheets having a thickness substantially less than ¼ inch. In glass sheets heated within a furnace to above the strain point and removed from the furnace for further treatment, tension stresses develop locally in a comparatively rapidly cooled portion when a portion adjacent thereto is cooled less rapidly thereby resulting in a steep temperature gradient between the two adjacent portions.

This stress in the lowermost portion of the pressed glass sheets is usually in tension because the lower portions tend to cool more rapidly than the rest of the sheet when the sheet is transferred from a heating furnace to an outside shaping station. The tensile strength of thin glass sheets is not sufficient to resist spontaneous fracture caused by both the unbalanced stress resulting from the natural rate at which thin glass sheets cool during transfer from the furnace to the shaping station and from the unbalanced stress induced by contact of the hot glass with the shaping members.

Before the present invention, it had been most difficult to press bend and temper glass sheets having a thickness of ⅛ inch.

The present invention has made it possible to bend glass sheets as thin as and less than ⅛ inch to produce bent face plates for television tubes.

According to the present invention, the glass sheet surface is exposed to additional heating after its removal from the furnace. Preferably this should take place immediately before engaging the glass sheet in pressurized contact between the glass shaping members.

In the preferred embodiment, this is accomplished by directing hot gaseous products in an upward direction against the lower portion of the glass sheet. The hot gaseous products flow upward over the major surfaces of the glass in such a manner that the heating effect of the rising gaseous currents is greatest at the lower edge of the glass and diminishes in an upward direction. Since heated glass sheets cool outside the furnace more rapidly at the bottom while the rising heat tends to impart some heat to the upper portion of the glass, the upward flow of hot gaseous products along the glass surface outside the furnace tends to compensate for the natural rate of cooling by providing the greatest concentration of heat where the rate of natural cooling is greatest and a lesser concentration of heat where less heat is required.

One apparatus for performing the present invention comprises an elongated pipe. The pipe has a plurality of closely spaced apertures aligned with and facing upward toward the path of movement taken by the glass sheet. Means is provided for supplying gas under pressure to the elongated apertured pipe for burning at the outlets of the aligned apertures to provide a vertical wall of flame intersecting the horizontally extending path of movement of the glass sheet. The wall of flame originates slightly below the bottom edge of the glass and is directed against said bottom edge.

In one embodimetn of the present invention, the gas pipe is disposed at the glass shaping station below and between the pair of shaping members when the latter are retracted. In another embodiment of the present invention, the elongated apertured pipe is disposed between the exit door of the furnace and the glass shaping station and extends longitudinally in alignment with the path of movement taken by the glass sheets traversing the path between the furnace and the shaping station.

The shaping members move away from the hot gaseous products when retracted. Thus, they cool somewhat between successive shaping operations. This intermittent cooling and the insulation provided by the fiber glass covering keeps the shaping members from being heated to temperatures higher than desired.

In addition, the intermittent exposure of the fiber glass covers permits them to cool also between shaping operations. This cooling following each contact with heat-softened glass results in longer life for the covers.

The additional heating that the glass sheet undergoes outside the furnace immediately before shaping eliminates the requirement for overheating the glass sheet while in the furnace. The additional heating compensates for the heat loss that takes place while the glass is transferred from the furnace to the shaping station. Therefore, the present invention minimizes the likelihood of causing distortion in the glass sheet while in the furnace to compensate for its heat loss during its transfer to the shaping station.

Furthermore, the exposure of the glass to burning gases and the product of combustion during the shaping operation heats the glass to bending temperature at the exact moment of bending. Also, the additional exposure of the bent sheet to the heated gases while the shaping members retract after the glass is shaped provides additional heat to the glass to help prevent glass breakage when the glass is subsequently chilled.

The invention will be understood more clearly in the light of the description of certain embodiments which follows.

In the drawings which form part of the description and wherein like references numerals refer to like structural elements, FIG. 1 is a longitudinal section of a portion of a continuous line for bending and tempering glass sheets showing an end of a furnace and a shaping station;

FIG. 3 is a fragmentary longitudinal section of an alternate embodiment of a continuous line for bending and tempering glass sheets;

FIG. 4 is an end view taken along the lines IV—IV of FIG. 3, showing how the elongated gas pipe is enclosed between vertical walls disposed on opposite sides of the path taken by a vertically supported glass sheet; and FIG. 5 is a simple circuit diagram of an electrical control for a solenoid valve controlling operation of an important element of the present invention.

Figure 1:
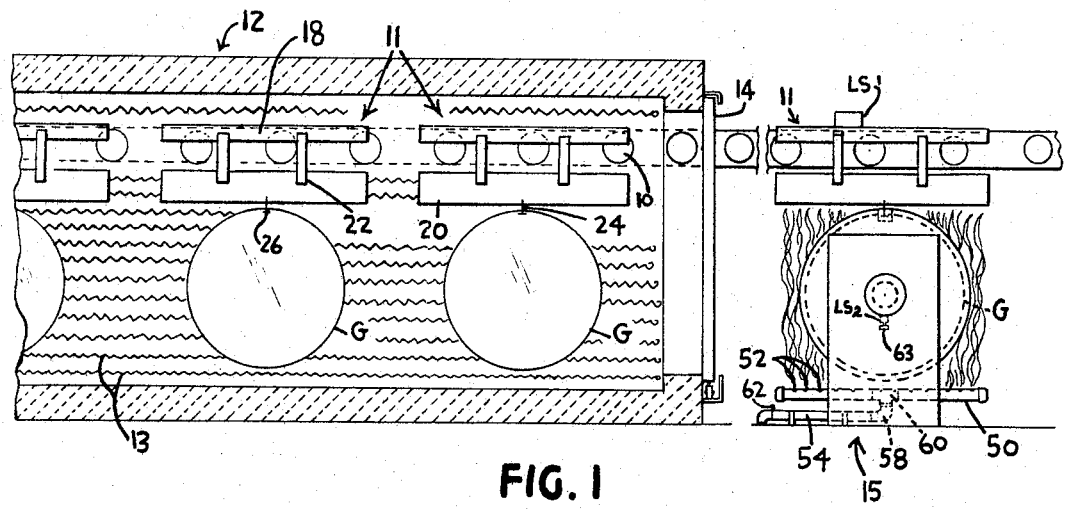

Referring to the drawings, reference number 10 refers to the driving rolls of a conveyor for moving carriages 11 through a furnace 12 having electrical heating elements 13 mounted on its walls, and an exit door 14, then through a glass tempering station 16 (FIG. 3). The conveyor continues through an unloading station (not shown). A return conveyor (not shown) is also provided for returning unloaded carriages to a loading station (not shown) in a manner well known in the art.

Each carriage 12 is composed of a cast iron alloy and comprises an upper beam 18 that rides on the conveyor rolls 10 and a lower beam 20 interconnected to the upper beam 18 by a pair of arcuately shaped vertically extending connecting rods 22. Glass gripping tongs 24 are suspended from the lower beams 20 of each carriage 12.

Each pair of tongs 24 has a pair of glass gripping elements 26 that apply opposing forces through the thickness of a glass sheet G to hang the glass sheet therefrom in a vertical plane. Preferably the glass gripping elements 26 are discs or disc-like members freely rotatable about axes extending vertically. U.S. Patent No. 3,089,727 to William J. Hay, Jr., shows such tongs.

Figure 2:
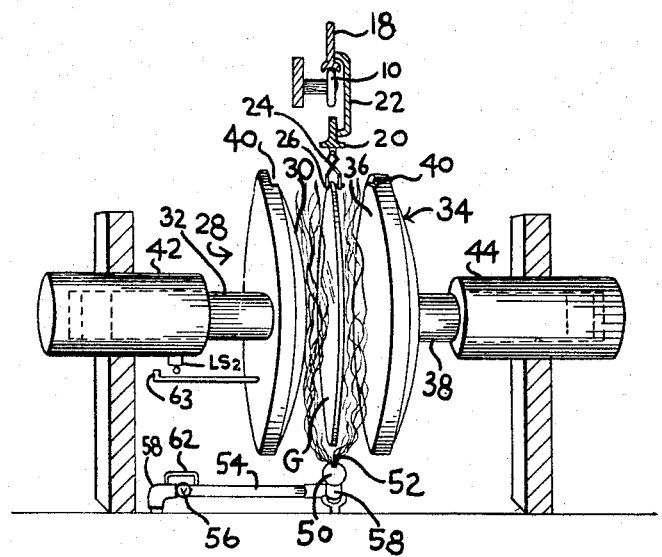
FIG. 2 is an end view of the shaping station of FIG. 1 with the shaping members shown partly in perspective.

Referring to FIG. 2, the glass shaping station 15 comprises a convex glass shaping member 28 having a convex shaping surface covered with a glass cloth cover 30. An actuating piston 32 is mounted to the rear of convex shaping member 28 to urge the latter to move along the axis defined by the length of the piston rod toward and away from a vertical plane occupied by the glass sheets G in succession at the glass shaping station 15.

On the other side of the vertical plane occupied by the glass sheets, the glass shaping station 15 comprises a concave glass shaping member 34. The latter has a concave shaping surface covered with a glass cloth cover 36. The concave shaping surface of glass shaping member 34 conforms to and is substantially complementary to the convex shaping surface of convex glass shaping member 28. Any slight difference in space between the shaping surfaces permits the insertion of a glass sheet of finite thickness therebetween.

An actuating piston 38 is mounted to the rear of the concave glass forming member 34 to urge the latter to move along the axis defined by the length of the plunger of the piston 38.

Each of the glass shaping members 28 and 34 is notched at 40 so as to provide clearance to receive the glass gripping elements 26 of tongs 24 therebetween when the glass shaping members are in pressurized engagement against opposite sides of a glass sheet in a plastic state.

The glass shaping members 28 and 34 are composed of a heat resistant material such as cast iron whose glass contacting surfaces are shaped to complementary convex and concave configurations. The shaping members are provided with a covering of fiber glass or asbestos or the like at their shaping surfaces. The covers 30 and 36 for the glass shaping members 28 and 34 are preferably composed of knit fiber glass cloth composed of texturized yarns and having sufficient resiliency to yield under pressure as described and claimed in application Ser. No. 178,278 of James H. Cypher and Clement E. Valchar for Bending Glass sheets, filed Mar. 8, 1962.

The pistons 32 and 38 are movably mounted within piston cylinders 42 and 44, respectively, to urge the glass shaping members 30 and 36 toward and away from mating engagement with one another. The piston cylinders 42 and 44 are rigidly attached to a support structure for the glass shaping station 15.

The tempering station is typical of the prior art and may be constructed as any of the devices illustrated in U.S. Patent No. 2,131,406 to Leonardo Mosmieri and Gino Dal Pino.

According to one embodiment of the present invention, an elongated gas burner 50 in the form of an elongated pipe extends longitudinally below the path of movement taken by the glass sheets G. In the embodiment of FIGS. 1 and 2, the elongated burner 50 extends lengthwise beyond the front and rear extremities of the glass shaping members 28 and 34. A series of apertures 52 longitudinally spaced and aligned along the length of the pipe is directed upward toward the bottom edge surface of the glass sheet. Natural gas is supplied from a source (not shown) through flexible supply hoses 54 suitably valved at a solenoid valve 56 and communicating with elbows 58 and T connection 60 to the elongated burner 50. A pilot line 62 bypasses the solenoid valve 56.

A limit switch LS-1 is located along the conveyor for actuation by a carriage 12 when supporting a glass sheet at the glass shaping station 15 to cause the solenoid valve to open the main gas line to the elongated burner 50 only when a glass sheet is in position to be shaped. Another limit switch LS-2 is carried by piston cylinder 42 for actuation by a trip device 63 rigidly attached to the rear of the glass shaping member 28 to close solenoid valve 56 when tripped thereby.

The main gas line is closed when the shaping members make total contact with the glass sheet. At this time, only the pilot line is feeding the elongated burner 50 so a low gas consumption results between shaping operations. Also, the fiber glass covers are not in contact with the flame, so that they need be replaced less frequently than if continually exposed to elevated temperature.

The elongated burner is preferably a 3/4 inch diameter pipe. The apertures 52 for the burner are preferably spaced at 5/8 inch centers and are fabricated using a #28 drill having a diameter of 0.1405 inch.

A typical electrical circuit for controlling the flow of gas from the main gas line comprises limit switch LS-1 in a series circuit with limit switch LS-2 and solenoid valve 56. Limit switch LS-1 normally holds solenoid valve 56 in the closed position. Limit switch LS-2 does not affect solenoid valve 56 except when actuated to cause solenoid valve 56 to close the main gas line by engagement with trip device 62. Thus, the circuit holds the main gas line open only when LS-1 is actuated and LS-2 is in its nonactuated position. This occurs only when a glass sheet is at the shaping station and before the shaping members contact the glass in pressurized engagement.

In order to provide a complete disclosure, a typical commercial operation will be described in the following example.

EXAMPLE I

The following details of a typical operation produced spherically curved face plates having a 28 inch radius of curvature to be laminated to television tubes. The face plates had a nominal thickness of 1/8 inch and a diameter of 21 inches. Actual thickness averaged about .120 inch.

Glass sheets were loaded into tong gripping relationship and conveyed at a constant speed through a furnace for a period of about 3 minutes while the tongs gripped their upper edges. During this conveyance through the furnace 13, the glass sheets were heated to a surface temperature of about 1225 degrees Fahrenheit. When the immediately preceding glass sheet had been shaped and the two forming members were being separated, the furnace exit door 14 opened and a glass sheet moved rapidly to the glass shaping station. About 4 seconds elapsed in moving the sheet from the furnace exit to the proper position at the glass shaping station in alignment between the glass shaping members.

The pistons 32 and 38 were so actuated that piston 38 caused concave shaping member 34 to contact the glass sheet to support it in the vertical plane in alignment with the line of apertures 52 of the elongated gas burner 50. This insured that the entire glass sheet was engulfed in flames resulting from the burning of the gas leaving the apertures 52 when solenoid valve 56 was actuated.

A brief moment after the glass was stabilized in vertical position by contact with the concave shaping member 34, it was shaped by pressurized contact with the convex shaping member 28 pressing against the glass and shaping it into conformity with the complementary shaping surface of concave shaping member 34. It took about 4 seconds for the glass shaping members to close and impress their shapes onto the opposite surfaces of the heat-softened glass sheet from the moment of initial contact.

The glass shaping members were held in pressurized contact of about 1 pound per square inch against the opposite surfaces of the glass sheet for about 6.5 seconds and then they retracted to permit the shaped glass sheet to move into a quenching station and to provide clearance between the glass shaping members to receive an immediately subsequent glass sheet therebetween for the next glass shaping operation.

In order to insure proper heating of the relatively thin glass sheets, natural gas was supplied at a pressure of 9 ounces per square inch to the elongated gas burner 50. The natural gas was mixed with air at the glass shaping station and burned as it escaped from the apertures 52. The flames extended upward a sufficient vertical distance to engulf the glass sheet G completely when the solenoid valve 56 was opened.

Hydraulic check means such as disclosed in Belgian Patent No. 585,647 may be incorporated with the glass shaping actuating means including the pistons 32 and 38 in order to insure that the glass shaping members move toward one another rapidly and then are hydraulically checked toward the end of their inward movement so as to minimize glass breakage which might otherwise occur.

The addition of the burning gas in the shaping operation for fabricating spherically shaped face plates for television tubes resulted in a substantial reduction in breakage in the production of this part. In fact, the gas burners made it feasible to bend thin glass sheets (having a thickness less than a nominal thickness of 1/4 inch).

In order to determine the benefits derived from the present invention, 6 glass sheets 21 inches in diameter were pressed to spherical curvatures to produce face plates for 21 inch round television tubes. Three of the plates were shaped while the glass was exposed to flames rising from a horizontally disposed elongated gas burner in the manner described in Example I above. The other 3 plates were shaped using the same technique except that the gas burner was turned off during their shaping.

Each of the plates was measured at 3 points around the periphery for thickness after they were bent. The 3 points were 90 degrees, 180 degrees, and 270 degrees from the tong gripping location. The average thickness was .127 inch for plates shaped while using a gas flame and averaged .128 inch for plates pressed without exposure to flame during the shaping. Thickness varied from .125 inch to .131 inch for the first group of 3 and from .124 inch to .130 inch for the second group.

The bent plates were stored overnight. One of the bent plates shaped without gas flame auxiliary heating failed in storage. The 5 remaining plates were subjected to stress measurements.

The edge compression and tension within the periphery were determined qualitatively by viewing the plates between crossed polaroids in the vicinity of each point where the thickness was measured. Edge stresses normal to the surface in the vicinity of these points were then measured quantitatively using a quartz wedge.

The particular means used for quantitatively measuring stresses optically involved placing the sheets of glass between a polarized light source and a graduated quartz wedge. The quartz wedge is calibrated in millimicrons. The polarized light passed through the thickness dimension of the sheet to be measured and the quartz wedge. A trained observer viewing directly into the quartz wedge observed a distinctive band which delineated and defined the maximum deviation of polarized light caused by the stress observed. The graduations on the quartz wedge permitted a direct reading of the magnitude of the strain in millimicrons through the glass thickness. This constitutes the maximum deviation of a beam of polarized light from the path it would take through the thickness of the glass if the glass were unstressed.

A trained observer is capable of determining the location of the regions most highly stressed in both compression and in tension by viewing the glass between crossed polaroids. This was accomplished by scanning the surface area of the glass along a radial line extending inward of each point of thickness measurement and observing the discolored areas where the stress locations exist. The strain corresponding to the stress at the selected locality of maximum tension stress inward of each point was then measured by looking through a quartz wedge directly into that locality.

The compressive stress of the peripheral margin of the glass sheet was measured by looking at the surface of the glass sheets directly at their edge, the compressive stress zone. The tensile stress of the peripheral margin of the glass was measured between about ½ to 1¼ inches inward from the edge of the sheets. The graduations on the quartz wedge yielded the measured strain value in units of millimicrons through the glass thickness.

The measured strain value is adjusted to millimicrons per inch by dividing the measured strain value by the thickness of the glass sample. This strain value adjusted to millimicrons per inch as described above may be converted to pounds per square inch stress units by multiplying the adjusted measured strain value for an inch of thickness by the stress optical coefficient. The stress optical coefficient varies for different glass compositions. For commercial glass compositions, such as used in automobile windshields, the stress optical coefficient is 2.13 pounds per square inch for each millimicron of strain adjusted to an inch of glass thickness.

The surface compression stress was measured with an instrument known as a differential surface refractometer. This instrument employs the principles of critical angle refractometry to measure a quantity proportional to the surface compression.

The instrument comprises an incandescent light bulb, a rectangular prism with a refractive index higher than that of the surface of the glass article, and a viewing telescope. The lower surface of the prism is placed in contact with the glass surface with a liquid of intermediate refractive index between the adjacent surfaces. Light rays originating at the incandescent lamp into the prism and the rays passing through the prism and striking the surface of the glass at the critical angle are refracted by the surface in such a manner as to reemerge and enter the viewing telescope. Because polarized components of the incident light have different refractive indices, light polarized parallel to the surface of the glass and light polarized perpendicular to the surface of the glass form two separate rays of light emerging from the prism. The two rays of polarized light are viewed in the telescope eyepiece. The distance between these lines is proportional to the difference between refractive indices of the polarized light components passing through the compression layer in the glass surface. Since the difference in refractive indices is a function of the compression stress in the glass surface, the compression stress can be determined by comparing the distance observed between the lines in the telescope with data calibrated from stresses determined by destructive testing experiments performed on glass articles whose separation between refracted polarized light components have been measured previously.

Table I below shows the average values of maximum tension stresses normal to the surface along the radial lines extending inward from the points of thickness measurement and the average stress meaurements on the major surfaces parallel to the surfaces about 1½ inches radially inward from the points of thickness measurement. The break in the plate that broke spontaneously originated approximately ½ inch inward from the edge on the concave surface of the bent sheet at a point where maximum tension was found in the other 2 sheets.

TABLE I.—SUMMARY OF STRESS AND STRAIN OF PLATES BENT WITH AND WITHOUT GAS FLAME

| How Bent | Average Maximum Tension Stress (p.s.i.) Normal to Surface | Marginal Surface Stress (p.s.i.) Parallel to Surface | |
|---|---|---|---|
| | | Concave | Convex |
| With Flame | 1,340 | 170C | 1,635C |
| Without Flame | 2,300 | 2,100T | 1,550C |

A study of Table I showed a dangerous tension surface stress parallel to the concave surface near the edges of the concave surface of the glass plates which had been pressed without a gas flame. This tension stressed area was believed to be the source of spontaneous fracture in the plate that failed overnight.

All 5 remaining plates were abraded with 80 grit Carborundum cloth using a circular motion on the convex surface of the plates. It was observed that none of the 5 plates developed into failures within 24 hours after such abrasive treatment.

The plates were similarly abraded on the concave surface. The two remaining plates which had been shaped without using a gas flame failed immediately when the concave surface was abraded. The 3 plates which had been shaped while using a gas flame were still intact 24 hours after such abrasion on the concave surface.

It was concluded from these tests that glass sheets which are pressed to shape without use of gas flame develop an unbalance of stress between the convex and the concave surfaces. This unbalance of stress causes a definite weakness in the shaped glass. The use of gas flames in the manner depicted results in materially improving the stress balance within the plate. Commercial operations improved markedly in yield after introducing the gas flame into operation.

The alternate embodiment found in FIGS. 3 and 4 shows how existing equipment for shaping glass of nominal thickness of ¼ inch can be converted for shaping relatively thin glass sheets according to the present invention. In the alternate embodiment, the apertured pipe 50 has its apertured portion extending between outside the furnace door 14 and the shaping station 15. In order to provide comfort for operating personnel, a pair of vertical walls 64 of heat insulating material such as asbestos and substantially coextensive in length with the pipe 50 are interconnected with a connecting member. The latter is supported on supports 68.

The heating of the glass sheets from heaters disposed to emit burning gases upwardly against the bottom edge and along the major surfaces of the glass as the latter traverses the space between the furnace exit and the shaping station has served to improve the yield from the mass production of television face plates of ⅛ inch thickness to be spherically bent. In addition, the second embodiment depicted in FIGS. 3 and 4 provide additional benefit of reducing the frequency of changes required for the fiber glass covers of the shaping apparatus.

Illustrative embodiments of the present invention have been discussed for the purpose of illustration. Many equivalent operations will become obvious in the light of the present disclosure. Reference to the scope of the present invention may be obtained from the claimed subject matter which follows.

What is claimed is:
1. In the art of bending a glass sheet comprising supporting said sheet in vertical position and pressing said sheet between shaping members while heat-softened, heating said sheet to shaping temperature within an enclosed atmosphere, removing said sheet from said enclosed atmosphere to a shaping station in a relatively cool atmosphere, and maintaining said sheet in a substantially vertical orientation in said relatively cool atmosphere wherein the lower regions of the sheet become cooler than the upper regions of the sheet, the improvement comprising reheating the sheet in said relatively cool atmosphere in a manner such that more heat is applied to said lower regions of the sheet than said upper regions to tend to compensate for the effect of the greater rate of cooling by exposing the surfaces of said glass sheet while at elevaed temperatures to an upward flow of hot gaseous products immediately before engaging said sheet in pressurized contact between said shaping members, and pressing the sheet to shape while the sheet is at a more nearly uniform shaping temperature as a consequence of said reheating.

2. The improvement according to claim 1, wherein said upward flow of hot gaseous products originates below said glass sheet and is directed against the bottom edge of said glass sheet to flow said hot gaseous products upward along the major surfaces of said sheet.

3. The improvement according to claim 1, wherein the exposure is continued during and immediately after said sheet is engaged in pressurized contact between said shaping members.

4. The improvement according to claim 1, wherein said hot gaseous products comprise flames covering both surfaces of said glass sheet.

5. Apparatus for bending a glass sheet comprising a furnace, a shaping station comprising a pair of shaping members located outside said furnace and having complementary shaping surfaces conforming to the shape desired for the glass sheet after bending, means for supporting said glass sheet in a substantially vertical position along a path extending through said furnace and through and beyond said shaping station for movement along said path into and out of said furnace and into and out of a position between said shaping members, means to bring said shaping members into pressurized contact against the opposite surfaces of said glass sheet when supported therebetween at said position and for withdrawing said shaping members from said pressurized contact, a gas burner located between the furnace and the portion of said path that extends beyond said shaping station beneath the path of movement taken by said glass sheets, a plurality of closely spaced orifices aligned with said path of movement and disposed in a vertical plane intersecting said path of movement taken by the glass sheets, said orifices directing hot gaseous products from said burner in an upward direction to flow along the opposite surfaces of a glass sheet supported vertically outside of said furnace to reheat the lower region of said glass sheet more than its upper region.

6. Apparatus as in claim 5, wherein said gas burner is disposed beneath said path intermediate said pair of shaping members.

7. Apparatus as in claim 5, wherein said gas burner is disposed beneath said path between said furnace and said pair of shaping members.

8. Apparatus as in claim 7, further including a pair of spaced vertical walls extending upward on opposite sides of the vertical plane occupied by said gas burner.

9. In a method of shaping a thin glass sheet disposed vertically comprising heating said sheet to above its annealing range in an enclosed hot atmosphere, removing the sheet from said hot atmosphere into a relatively cold atmosphere for shaping, maintaining said sheet in said relatively cold atmosphere in a substantially vertical orientation wherein the sheet develops a temperature gradient with a higher temperature in its upper region than in its lower region, the improvement comprising reheating the glass sheet in said relatively cold atmosphere while so maintained in a manner to increase the temperature of its lower region more than that of its upper region by applying heat in an upward direction from a source below said sheet, thereby tending to equalize the glass sheet temperature, and immediately thereafter engaging the sheet so heated in pressurized contact between a pair of shaping members having complementary shaping surfaces conforming to the shape desired for the glass sheet.

10. A method as in claim 9, further including disengaging said shaping members from said pressurized contact, further reheating said sheet in said manner of reheating while said shaping members are disengaged and rapidly cooling said reheated sheet immediately after said further reheating.

References Cited

UNITED STATES PATENTS

| | | | |
|---|---|---|---|
| 1,332,724 | 3/1920 | Hill | 65—104 |
| 2,551,311 | 5/1951 | Batchell | 65—104 |

DONALL H. SYLVESTER, *Primary Examiner.*

A. D. KELLOGG, *Assistant Examiner.*